(12) United States Patent
MacInnis

(10) Patent No.: US 8,122,206 B2
(45) Date of Patent: *Feb. 21, 2012

(54) SYSTEMS, METHODS, AND APPARATUS FOR PIXEL FETCH REQUEST INTERFACE

(75) Inventor: Alexander G. MacInnis, Ann Arbor, MI (US)

(73) Assignee: Broadcom Corporation, Irvine, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 12/391,648

(22) Filed: Feb. 24, 2009

(65) Prior Publication Data

US 2009/0271542 A1    Oct. 29, 2009

Related U.S. Application Data

(63) Continuation of application No. 11/440,836, filed on May 25, 2006, now Pat. No. 7,512,752.

(60) Provisional application No. 60/686,038, filed on May 31, 2005, provisional application No. 60/689,180, filed on Jun. 10, 2005.

(51) Int. Cl.
*G06F 13/00* (2006.01)

(52) U.S. Cl. ........................................... 711/154

(58) Field of Classification Search ........................ None
See application file for complete search history.

(56) References Cited

U.S. PATENT DOCUMENTS

| | | | |
|---|---|---|---|
| 5,920,352 A * | 7/1999 | Inoue | 348/384.1 |
| 5,926,187 A | 7/1999 | Kim | |
| 6,256,349 B1 * | 7/2001 | Suzuki et al. | 375/240.18 |
| 6,301,299 B1 * | 10/2001 | Sita et al. | 375/240.01 |
| 6,421,385 B1 * | 7/2002 | Uenoyama et al. | 375/240.2 |
| 6,853,382 B1 | 2/2005 | Van Dyke et al. | |
| 7,630,441 B2 * | 12/2009 | Lee et al. | 375/240.25 |
| 7,933,459 B2 * | 4/2011 | Sato et al. | 382/239 |
| 2003/0106053 A1 * | 6/2003 | Sih et al. | 725/25 |
| 2004/0056865 A1 | 3/2004 | Shimomura et al. | |
| 2006/0008001 A1 * | 1/2006 | Lee et al. | 375/240.03 |
| 2007/0140576 A1 * | 6/2007 | Sato et al. | 382/251 |

OTHER PUBLICATIONS

European Search Report corresponding to European Patent Application No. 06010917.0-1228, dated Oct. 8, 2009.

* cited by examiner

*Primary Examiner* — Kevin Verbrugge
(74) *Attorney, Agent, or Firm* — Thomas, Kayden, Horstemeyer & Risley, LLP

(57) ABSTRACT

Presented herein are system(s) and apparatus for a memory access unit for accessing data for a module. The memory access unit comprises an output port for providing access requests for lists of addresses in a memory over a link to a memory controller.

19 Claims, 7 Drawing Sheets

SYSTEMS, METHODS, AND APPARATUS FOR PIXEL FETCH REQUEST INTERFACE

RELATED APPLICATIONS

This application is a continuation of "Systems, Methods, and Apparatus for Pixel Fetch Request Interface", U.S. patent application Ser. No. 11/440,836, filed May 25, 2006, which issued as U.S. Pat. No. 7,512,752 and claimed priority to "Systems, Methods, and Apparatus for Pixel Fetch Request Interface", Provisional Application for U.S. Patent, Ser. No. 60/686,038, filed May 31, 2005 by MacInnis, and "Systems, Methods, and Apparatus for Pixel Fetch Request Interface", Provisional Application for U.S. Patent, Ser. No. 60/689,180, filed Jun. 10, 2005 by MacInnis.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Integrated circuits can include modules that perform a variety of functions. Each of the foregoing modules may access a shared memory in the performance of its functions. The shared memory may comprise, for example, a dynamic random access memory (DRAM). A DRAM controller controls access to the DRAM.

The functions can send requests for memory accesses to the DRAM controller over a DRAM access bus supporting multiple functions. The functions may operate at different clock speeds from one another as well as the memory. Additionally, some of the functions may operate in real time. Arbitration and real time scheduling are used when more than one function requests access during a particular time interval. The requests are serialized over the bus.

A DRAM can comprise any number of banks, although four is typical. Each bank comprises any number of rows. Before a memory access to a particular location, the bank comprising the particular location is electrically pre-charged. After pre-charging the bank, the particular row and location can be accessed. The time for electrically pre-charging the row is usually a significant fraction of this total time. Additionally, once the particular row is accessed, other memory locations in the same row can also be accessed without requiring additional pre-charge operations. Accordingly, accesses to a memory row can be characterized by a large overhead, and smaller marginal costs.

Real time scheduling can take advantage of the foregoing qualities of the DRAM by scheduling burst transactions for the functions. In a burst transaction, the functions access a large number of consecutive memory locations that are typically on the same row of one bank, or on one row of each of multiple banks. Burst transactions are easier to implement with functions that tend to access consecutive locations within each row of the DRAM.

However, certain functions may not tend to access consecutive locations of the DRAM. One example of a function that may not tend to access consecutive locations of the DRAM is a motion compensation function in a video encoder or decoder. In standards such as Advanced Video Coding (AVC), also known as MPEG-4 Part 10 AVC, or ITU-T H.264, predicted pixels may be predicted from blocks of reference pixels in a reference frame that are as small as 2×2 or as large as 21×21. One block of reference pixels can straddle multiple rows and banks of DRAM. Additionally, reference pictures can be stored in memory in a variety of ways. Accordingly, the memory locations that store the reference pixels can tend to be non-consecutive.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system, method, and/or apparatus for a pixel fetch request interface, substantially as shown in and/or described in connection with at least one of the figures, as set forth more completely in the claims.

These and other advantages and novel features of the present invention, as well as illustrated embodiments thereof will be more fully understood from the following description and drawings.

DETAILED DESCRIPTION OF THE INVENTION

Figure 1:
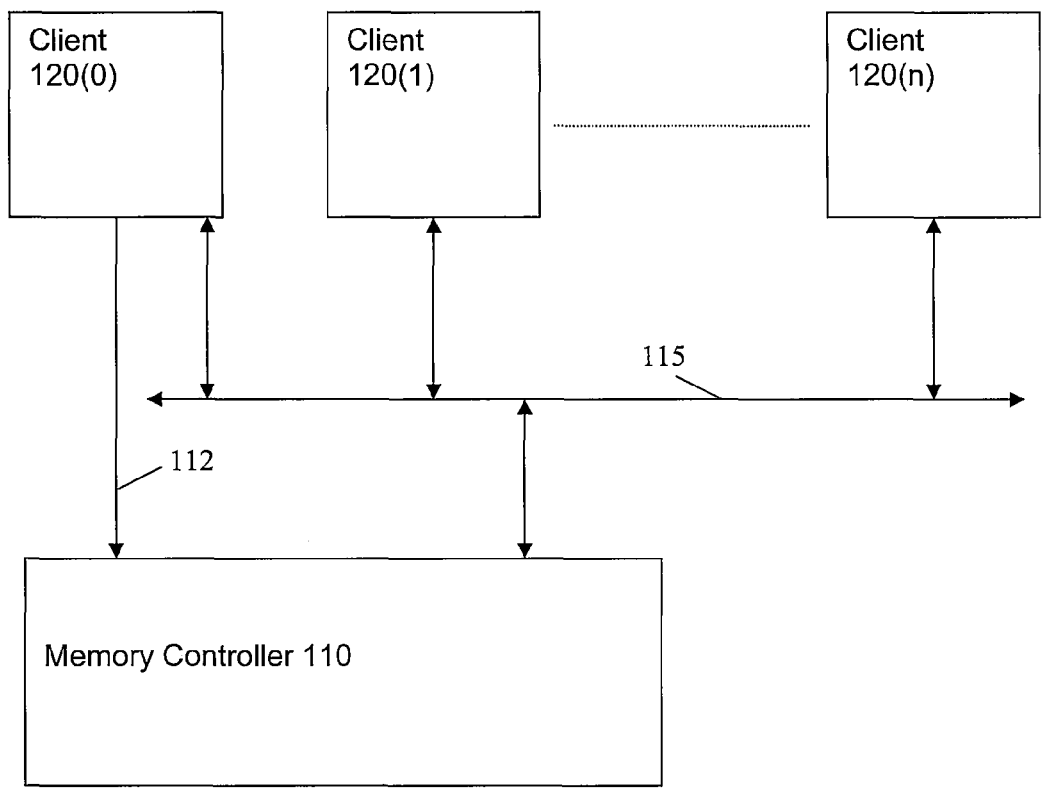
FIG. 1 is a block diagram of an exemplary system for accessing and providing memory data in accordance with an embodiment of the present invention.

Referring now to FIG. 1, there is illustrated a block diagram of an exemplary system in accordance with an embodiment of the present invention. The system comprises a particular client 120(0) for performing a particular function, and one or more other clients 120(1) ... 120(n) for performing one or more other functions. In the course of performing the particular function and the one or more functions, the particular client 120(0) and the one or more other clients 120(1) ... 120(n) may access locations in a memory. Additionally, the clients 120(0) ... 120(n) may operate at the same or different clock speeds.

A memory controller 110 controls access to the memory. The particular client 120(0) makes requests to access lists of addresses in the memory over a link 112 between the particular client 120(0) and the memory controller 110. In certain embodiments of the present invention, the particular client can comprise a memory access unit.

The link 112 can comprise, for example, but not limited to, a point-to-point link, or another bus. Other clients 120(1) . . . 120(n) provide requests to access the addresses in the memory using the bus 115. Where more than one of the other clients 120(1) . . . 120(n) attempts to request access during a certain period of time, a bus arbiter arbitrates the requests.

According to certain aspects of the present invention, the memory controller 110 provides data from the memory that is stored at the address requested to access by the clients 120(1) . . . 120(n), as well as the particular client 120(0) over the bus 115. In an alternative embodiment, the memory controller 110 provides requested data over the link 112.

Figure 2:
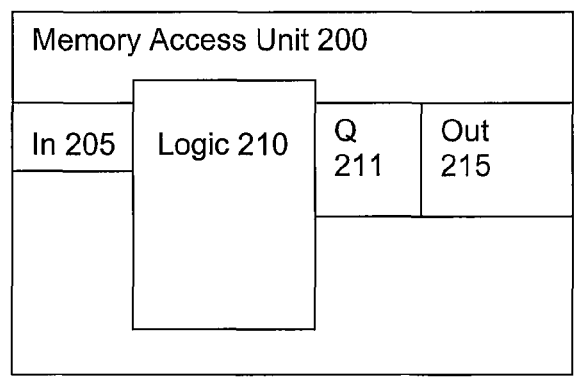
FIG. 2 is a block diagram of an exemplary memory access unit in accordance with an embodiment of the present invention.

Referring now to FIG. 2, there is illustrated a block diagram describing an exemplary memory access unit 200 in accordance with an embodiment of the present invention. The memory access unit 200 fetches data for a client and comprises an output port 215. The output port 215 provides, over a link 112, access requests for lists of memory addresses to a memory controller 110.

In a certain embodiment of the present invention, the memory access unit 200 can also comprise a queue 211. The queue 211 queues the access requests for the lists of addresses. Additionally, the memory access unit 200 can receives requests for certain data via an input port 205. The requests for the data may specify the data requested in another manner, besides the address storing the data. Thus, the memory access unit 200 can include logic 210 for generating lists of addresses from the requests that correspond to addresses in a memory that store the data.

The logic 210 can determine the addresses that store the data, based on the memory organization and the manner that the data is stored in the memory. Additionally, the logic 210 can generate the lists of addresses in an order that optimizes accesses to the memory.

For example, where the memory comprises memory banks with rows, and wherein access to a particular row of a memory bank is characterized by a large time overhead, the logic 210 can generate the lists of addresses that group addresses referring to the same row of a memory bank into a common transaction.

According to certain aspects of the present invention, the memory access unit 200 can receive the data requested over a shared bus, in contrast to the request link for transmitting the requests to the memory controller. Alternatively, the memory access unit 200 can receive the data requested over the request link.

Figure 3:
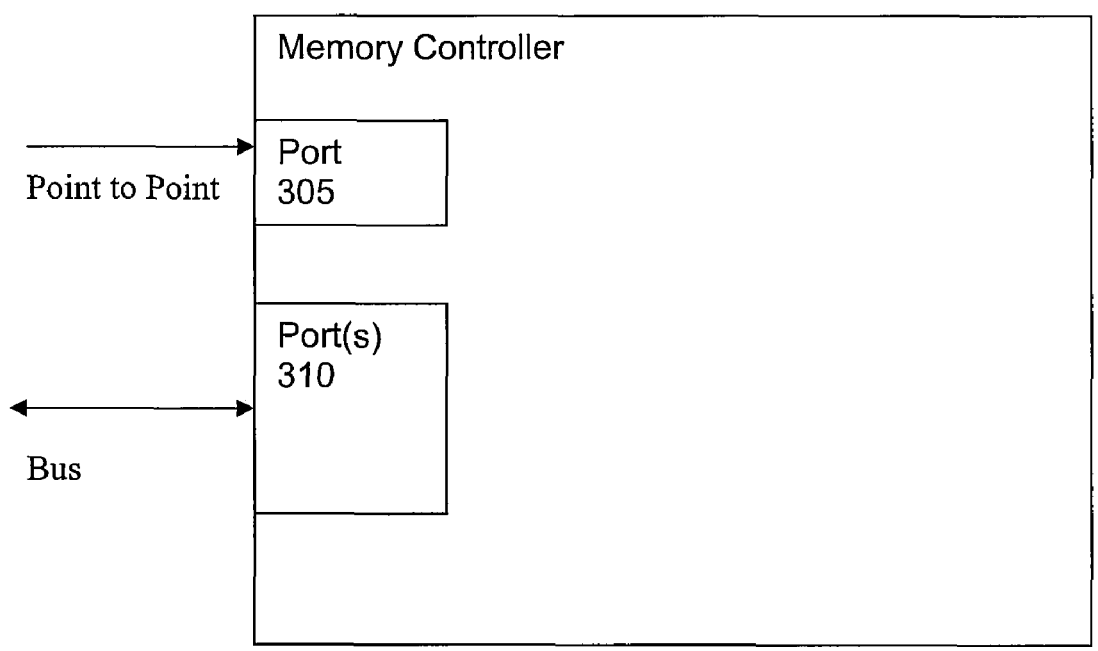
FIG. 3 is a block diagram of a memory controller in accordance with an embodiment of the present invention.

Referring now to FIG. 3, there is illustrated a block diagram of an exemplary memory controller 300 in accordance with an embodiment of the present invention. The memory controller 300 comprises a port 305 for receiving access requests for lists of addresses in a memory over a link from a particular client, e.g., memory access unit 200. The memory controller 300 also includes other port(s) 310 for receiving requests for accessing the memory over a shared bus from one or more other clients.

According to certain aspects of the present invention, the memory controller 300 can also comprise a queue for queuing the access requests for the lists of addresses received at port 305. Additionally, an arbiter can arbitrate between the requests for lists of addresses from the particular client and the requests for accessing the memory from the one or more other clients.

In certain embodiments of the present invention, the memory controller 300 transmits the data stored at the addresses in the memory from the lists of addresses received from the port 305 over port(s) 310. Alternatively, the data can be returned over a point to point link.

The present invention can be used in a variety of contexts for a wide variety of applications. For example, the present invention can be used for decoding video data. Following is a brief description of particular video compression standard, Advanced Video Coding (AVC, also known as H.264, and MPEG-4, Part 10), followed by description of exemplary video processor(s) in accordance with embodiments of the present invention.

H.264 Standard

Figure 4:
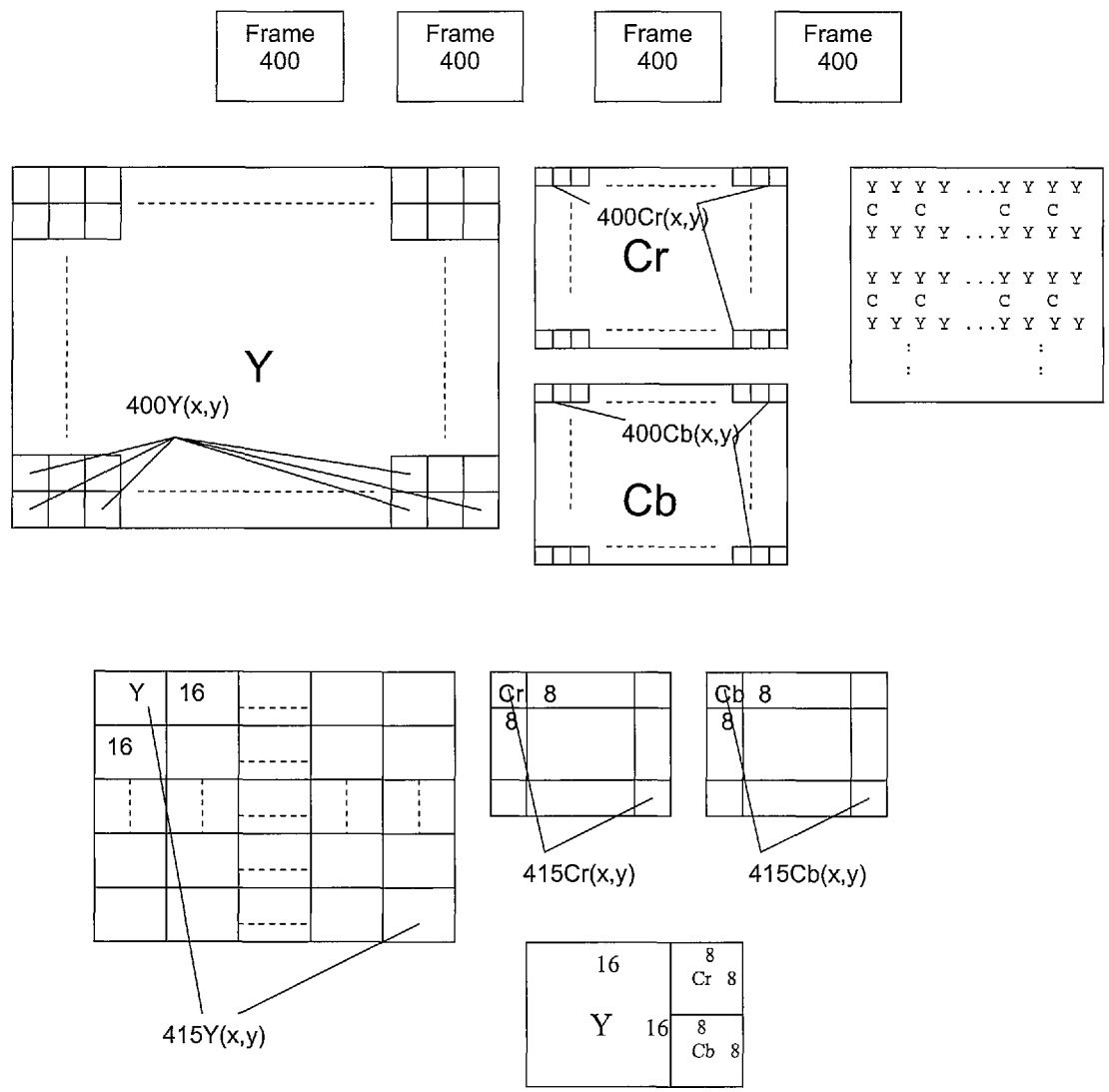
FIG. 4 is a block diagram describing the encoding of video data in accordance with the Advanced Video Coding standard.

Referring now to FIG. 4, there is illustrated a block diagram of a frame 400. A video camera captures frames 400 from a field of view during time periods known as frame durations. The successive frames 400 form a video sequence. A frame 400 comprises two-dimensional grid(s) of pixels 400(x,y).

For color video, each color component is associated with a two-dimensional grid of pixels. For example, a video can include luma, chroma red, and chroma blue components. Accordingly, the luma, chroma red, and chroma blue components are associated with a two-dimensional grid of pixels 400Y(x,y), 400Cr(x,y), and 400Cb(x,y), respectively. When the grids of two dimensional pixels 400Y(x,y), 400Cr(x,y), and 400Cb(x,y) from the frame are overlayed on a display device 410, the result is a picture of the field of view at the frame duration that the frame was captured.

Generally, the human eye is more perceptive to the spatial detail of the luma characteristics of video, compared to the chroma red and chroma blue characteristics. Accordingly, in commonly use profiles of the AVC standard there are more pixels in the grid of luma pixels 400Y(x,y) compared to the grids of chroma red 400Cr(x,y) and chroma blue 400Cb(x,y). In the 4:2:0 sampling format, the grids of chroma red 400Cr(x,y) and chroma blue pixels 400Cb(x,y) have half as many pixels as the grid of luma pixels 400Y(x,y) in each direction.

A set of luma pixels of the frame 400Y(x,y) can be divided into 16×16 pixel 400Y(16x->16x+15, 16y->16y+15) blocks 415Y(x,y). For each 16×16 block of luma pixels 415Y(x,y), there are corresponding 8×8 blocks of chroma red pixels 415Cr(x,y) and chroma blue pixels 415Cb(x,y). A 16×16 block of luma pixels 415Y(x,y), and the corresponding 8×8 blocks of chroma red pixels 415Cr(x,y) and chroma blue pixels 415Cb(x,y) are collectively known as a macroblock 420.

The H.264 standard encodes video on a frame by frame basis or a field by field basis, and encodes frames or fields on a macroblock by macroblock basis. H.264 specifies the use of spatial prediction, temporal prediction, transformation, interlaced coding, and lossless entropy coding among other techniques to compress the macroblocks 420.

Figure 5:
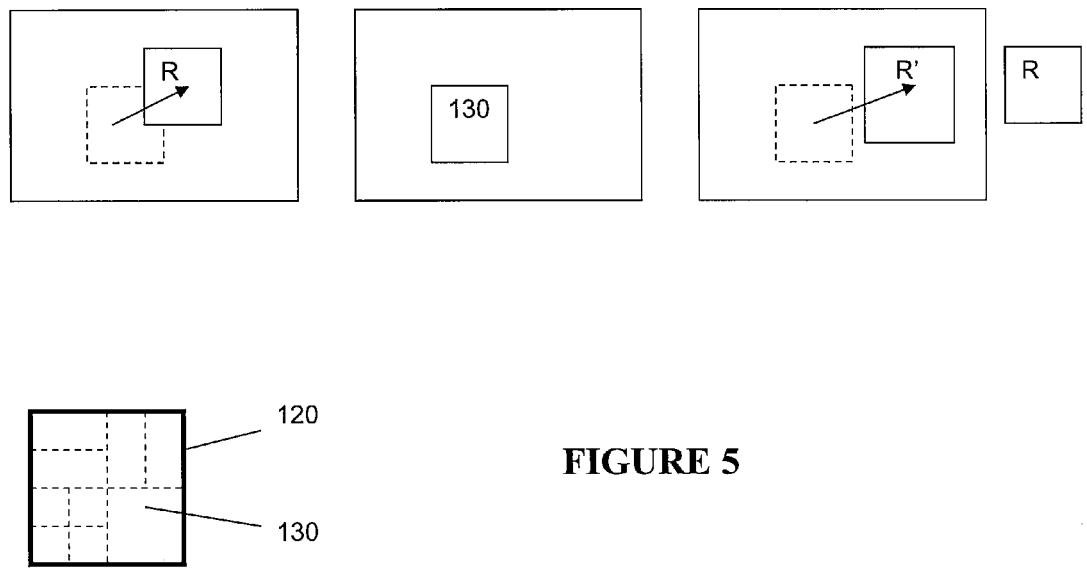
FIG. 5 is a block diagram describing the encoding of video data in accordance with the Advanced Video Coding standard.

Referring now to FIG. 5, there is illustrated a block diagram describing a temporally predicted block 130. Block 130 can be predicted from a block of pixels R in other frames or fields. The block of pixels used for prediction is known as the reference pixels R.

In some cases, a block of reference pixels R is interpolated from another block of reference pixels R'. For example, a six tap filter may interpolate the block of reference pixels R from the block of reference pixels R'. The blocks of reference pixels R' can be as large as 21×21.

The difference between the block 130 and the reference pixels R or R' is known as the prediction error E. The prediction error E is calculated and encoded, along with an identification of the reference pixels R or R'. The reference pixels R or R' are identified by motion vectors MV and an indication of the reference picture containing them. Motion vectors MV describe the spatial displacement between the block 130 or macroblock and the reference pixels R. The motion vectors MV can, themselves, be predicted from the MVs of neighboring partitions and macroblocks.

During the decoding of video data, the frames or fields may be decoded on a macroblock by macroblock basis. Additionally, the macroblocks may be decoded in a left to right and top to bottom order. The decoded macroblocks may be written to a memory, such as a DRAM. Additionally, as described above, macroblocks may be predicted from blocks of reference pixels R from other previously decoded fields or frames. To decode the macroblocks, the decoder fetches the reference pixels R from the DRAM.

It is noted that the blocks of reference pixels R are usually not aligned with macroblock boundaries. It is thus possible that blocks of reference pixels R can straddle multiple macroblocks. In the case of a 21×21 block of reference pixels R, the block of reference pixels R can straddle as many as nine different macroblocks.

The macroblocks that are straddled by the reference pixels R may be written to the DRAM in different transactions. Accordingly, the particular memory locations storing the reference pixels R are not guaranteed to be consecutive, nor even proximate with respect to one another.

Figure 6:
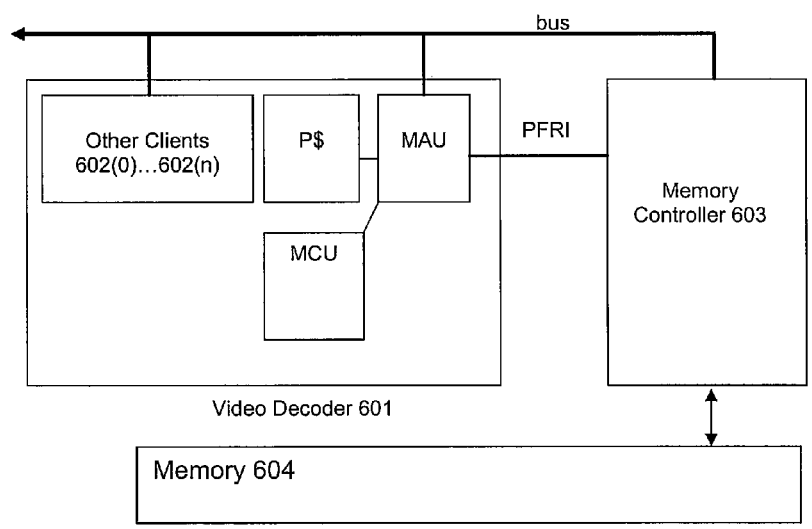
FIG. 6 is a block diagram of an exemplary system in accordance with an embodiment of the present invention.

Referring now to FIG. 6, there is illustrated a block diagram of an exemplary system in accordance with an embodiment of the present invention. The system comprises a video decoder 601, a memory controller 603, and a memory 604.

The video decoder 601 receives and decodes video data. The video decoder 601 comprises a motion compensation unit MCU, a deblocking unit DBU, cache P$, and any number of other clients 602(0) . . . 602(n). The motion compensation unit MCU applies the decoded prediction error E to the reference pixels R. The motion compensation unit accesses the memory 604 via a memory access unit MAU. The other clients access the memory 604 via a bus. According to certain embodiments of the present invention, the memory access unit MAU can also make requests over the bus.

The memory 604 can comprise any number of banks, although four is typical. Each bank comprises any number of rows. Before a memory access to a particular location, the bank comprising the particular row that comprises the particular location is electrically charged. After pre-charging the bank, the particular location can be accessed. The time for electrically pre-charging the bank is usually a significant fraction of this total time. Additionally, once the particular row is accessed, other memory locations in the same row can also be accessed without requiring additional pre-charge operations. Accordingly, accesses to a memory row can be characterized by a large overhead, and smaller marginal costs.

Real time scheduling can take advantage of the foregoing qualities of the memory 604 by scheduling burst transactions for the clients 602(0) . . . 602(n) over the bus. In a burst transaction, the functions access a large number of consecutive memory locations that are typically on the same row of one bank, or on one row of each of multiple banks. Burst transactions are easier to implement with functions that tend to access consecutive locations of the DRAM.

However, certain functions may not tend to access consecutive locations of the memory 604. For example, the motion compensation unit MAU accesses sets of prediction pixels where the sizes of the sets may vary widely. For example, in AVC the reference pixel fetches for chroma can be as small as 2×2, and reference pixel fetches for luma can be as large as 21×21. The reference pixels in one set can straddle as many as nine macroblocks. There can be a substantial number of reference fetches associated with decoding one macroblock. Additionally, the reference frame can be stored in memory in a variety of ways.

Additionally, in systems that incorporate a cache in Video Decoder 601, some of the DRAM addresses that comprise a block fetch request may be satisfied by the cache and other addresses may be requested from DRAM, leading to discontinuities in the addresses requested from DRAM. Accordingly, the memory locations that store the reference pixels can tend to be non-consecutive.

In certain embodiments of the present invention, the macroblocks of the reference frames can be stored in the memory 604 in a manner that assures that any combination of macroblocks that can be straddled by a block of reference pixels are stored in no more than one row of each bank of the memory 604.

To relieve the internal video decoding modules such as the MCU from the burden of knowing the detail of the memory pixel data arrangement and access protocol, the pixel related accesses with the system are handled by the memory access unit MAU. The MAU converts each reference pixel request into memory access requests according to the memory organization and passes the requests to the memory controller 603 via a pixel fetch request interface PFRI. The pixel fetch request interface PFRI can comprise a point-to-point link. Alternatively the PFRI can support multiple requesting functions. According to certain embodiments of the present invention the MAU can receive requests from additional modules, and may include arbitration logic.

Figure 7:
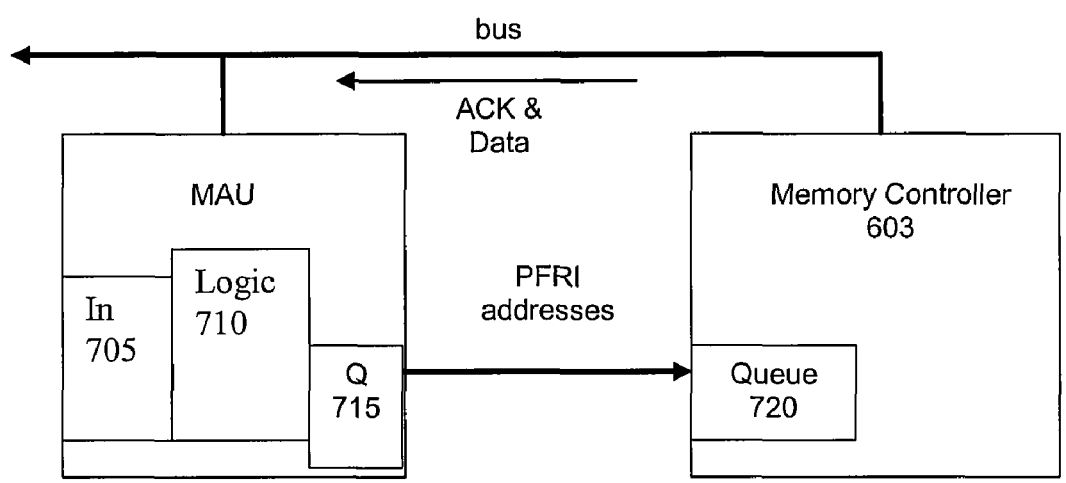
FIG. 7 is a block diagram of a pixel fetch request interface in accordance with an embodiment of the present invention.

Referring now to FIG. 7, there is illustrated a block diagram describing the pixel fetch request interface in accordance with an embodiment of the present invention. The memory access unit MAU provides requests for access to lists of addresses in the memory 604 to the memory controller 603, via a pixel fetch request interface PFRI.

The memory access unit MAU comprises an input port 705 for receiving requests for blocks of reference pixels from a motion compensation unit, logic 710 for generating requests for accessing lists of addresses in the memory 604 from the requests for blocks of reference pixels, and a queue 715 for providing the requests for accessing lists of addresses over the pixel fetch request interface PFRI. The memory controller 603 includes a queue 720 for receiving the requests from the PFRI.

The PFRI supports streaming of DRAM word address requests to the memory controller 603. According to certain embodiments, these requests are read requests. The data that is associated with these requests are returned via the bus. Alternatively, the data that is associated with these requests can be returned via the PFRI. The MAU creates lists of DRAM word addresses corresponding to DRAM words of data that are needed for temporal prediction.

In certain embodiments of the present invention, the lists of DRAM word addresses can exclude DRAM words that are currently in the cache P$. These can be any subset of the entire sets of DRAM words that are used for motion compensation of the blocks of video. By virtue of the design of the MCU, MAU and P$, the order of the DRAM word addresses in the lists may be all luma DRAM words for one whole macroblock and then all chroma DRAM words for that same macroblock. The lists of luma, and then chroma, DRAM word addresses within each macroblock are in an order that is intended to produce the minimum amount of memory overhead in the event that the P$ misses on all of the DRAM words in that macroblock. In cases where the P$ has some hits for the DRAM words required for a given macroblock, those DRAM words do not appear in the lists of addresses made to the memory controller 603 over PFRI, while the order of the remaining DRAM word addresses that are requested is not changed.

The transmission of DRAM word address requests on the PFRI can be independent of memory request and grant activity, rather it can be modulated by a flow control mechanism on the PFRI. According to certain embodiments of the present invention, there may be a clock-synchronous (flop-flop) ready-accept protocol as part of the PFRI specification.

It may be important to the memory controller 603 and to real time scheduling behavior for the PFRI to include commands that indicate partitioning a list into groups between assumed memory bursts, with one group of requests controlling the actions of one assumed memory burst. The size of each group can be set by the memory controller 603 architecture, however this choice may affect RTS behavior in subtle yet important ways. In certain embodiments of the present invention, the number of DRAM word addresses per group is limited to 16. The PFRI can also include an End-of-Group indication, indicating the end of each group of DRAM word addresses.

If the size of a group is limited to 16 16-byte DRAM words, which is less than the maximum request size required for MCU prediction fetches in some cases, (for example 24 for AVC, 28 for VC-1 in an exemplary embodiment), the MAU would split these larger lists of addresses into two groups, or make some other arrangement to limit the group size. Assuming the memory controller 603 treats each group as one memory transaction, splitting the groups in this way would increase the total amount of memory cycle overhead. Alternatively, the maximum size of the group can be at least as large as the maximum number of DRAM words that are used for prediction of one macroblock.

In certain embodiments of the present invention, the MAU can send "Bank Open Hint" and "Bank Close Hint" commands to the memory controller 603. The Bank Open Hint would inform the memory controller 603 that a particular bank-row will be needed by one or more DRAM word addresses that is following shortly (but not necessarily the next command on the PFRI). The Bank Close Hint would inform the memory controller 603 that a particular bank-row that was needed by preceding DRAM word addresses will not be needed by future DRAM word addresses, at least not until after the newly opened bank-row in the same bank is closed.

In certain embodiments of the present invention, for read data requested via the PFRI, the DRAM word address requests transmitted via the PFRI constitute requests for memory access similar in some ways to requests made via the bus. The MAU has an identified client identifier ID for PFRI requests. When a set of PFRI requests wins memory arbitration, the memory controller 603 reads the requested data from memory and returns an ACK to the MAU client ID along with by the data, both via the bus.

The PFRI can be specified such that a request can refer to any DRAM word address in the largest possible memory address space. For example, the interface may be designed to support a 4 GB (32 bit) memory address space. Therefore each DRAM word address requested on PFRI should use 28 bits (32−4) in an exemplary embodiment. The memory controller 603 can simply ignore (discard) all higher order address bits that represent addresses not supported by the specific memory controller 603 implementation.

The PFRI can also include a signal to indicate command vs. data, and flow control signals suitable for high speed operation. The commands on PFRI would include, typically, an "end-of-group" command to delineate groups of Gword requests.

The clock frequency of the PFRI can be chosen independently of other clock frequencies in the memory controller 603, and the video decoder 601. However, it may be desirable to specify the PFRI to operate at the memory clock frequency, to facilitate the design of the logic 710 in the MAU and to minimize places where the information cross clock boundaries. Alternatively it may be desirable to specify the PFRI to operate at the MAU clock frequency, for similar reasons.

Figure 8:
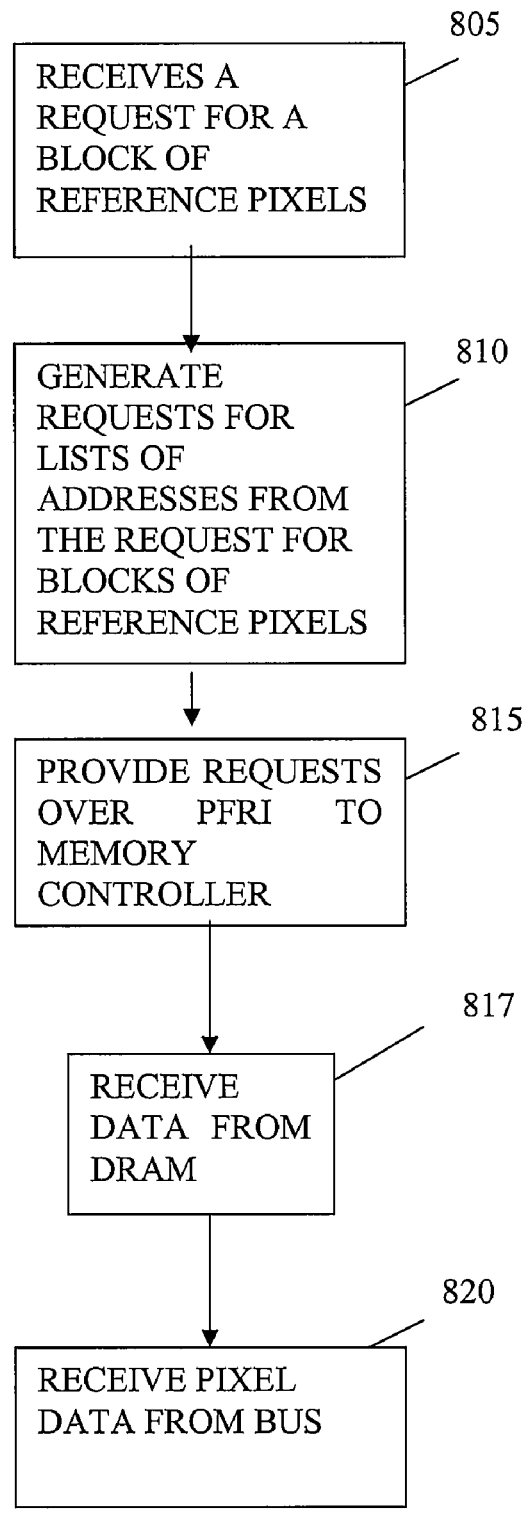
FIG. 8 is a flow diagram for fetching pixels in accordance with an embodiment of the present invention.

Referring now to FIG. 8, there is illustrated a flow diagram for accessing reference pixel data in accordance with an embodiment of the present invention. At 805, the input 705 receives a request for a block of reference pixels.

At 810, the logic 710 generates requests for lists of addresses from the request for blocks of pixels received at the input port. At 815, the output port Q 715 provides the requests over the PFRI to the memory controller 603. At 817, the memory controller receives the data from the DRAM. At 820, the memory access unit receives the pixel data from the bus.

Figure 9:
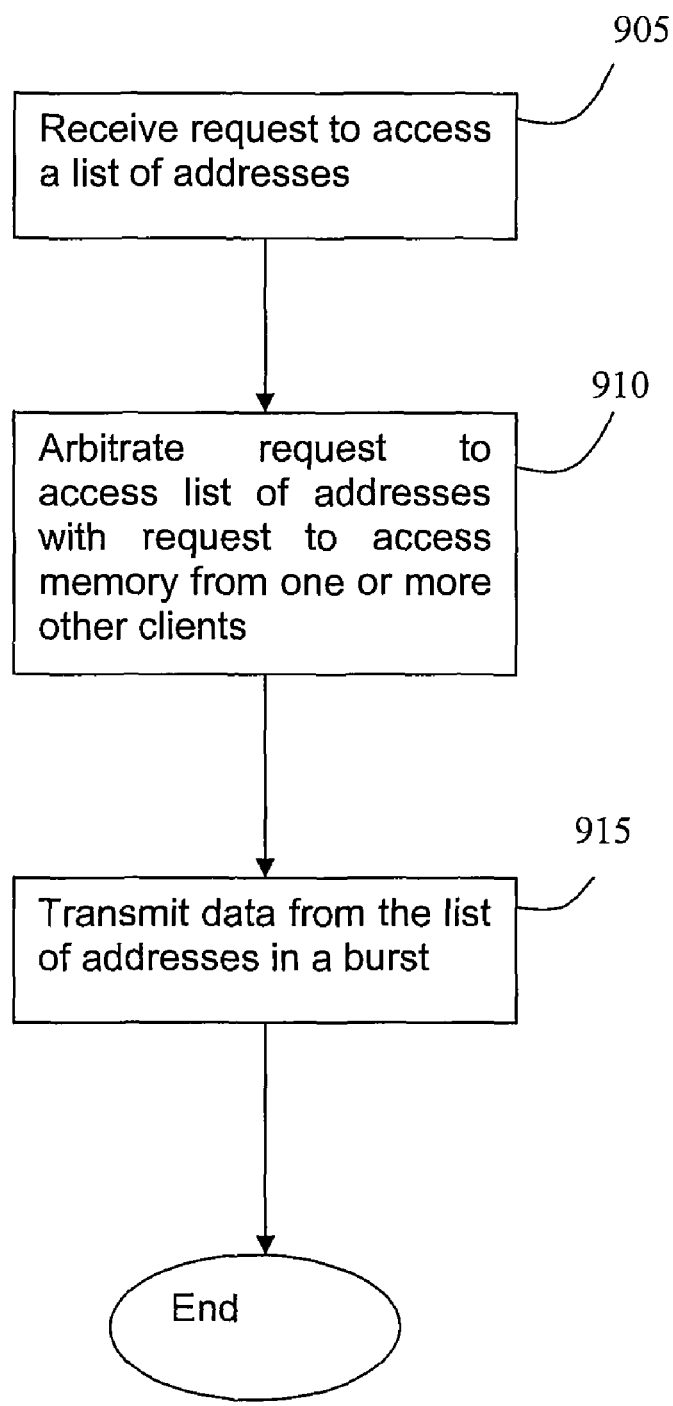
FIG. 9 is a flow diagram for providing pixels in accordance with an embodiment of the present invention.

Referring now to FIG. 9, there is illustrated a flow diagram for providing reference pixel data in accordance with an embodiment of the present invention. The memory controller 603 waits until it receives a request to access a list of addresses at 905. At 910, the memory controller arbitrates the request to access the list of addresses with requests for accessing the memory from one or more clients. When the request to access the list of addresses prevails in arbitration, at 915, the memory controller reads the data from DRAM and transmits the data from the addresses in the list of addresses in a burst.

The embodiments described herein may be implemented as a board level product, as a single chip, application specific integrated circuit (ASIC), or with varying levels of the system integrated with other portions of the system as separate components. Alternatively, certain aspects of the present invention are implemented as firmware. The degree of integration may primarily be determined by the speed and cost considerations.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, a processor that performs video encoding or other processing may utilize the PFRI, whereas a video decoder is described in the present application. For example, the PFRI can be designed to support multiple requesters, e.g., memory access units MAU, by sharing the PFRI interface and preferably including multiple queues inside the memory controller. Alternatively, more than one PFRI may access the memory controller. Additionally, more than one different device, such as the motion compensation unit and a deblocker, or a motion estimation unit and a motion compensation unit, may make requests via a single memory access unit.

Therefore, it is intended that the present invention not be limited to the particular embodiment disclosed, but that the present invention will include all embodiments falling within the scope of the appended claims.

The invention claimed is:

1. A memory access unit for accessing data for a module, said memory access unit comprising:
   an input port for receiving request for blocks of pixels from a motion prediction processing unit; and
   an output port for providing access requests for lists of addresses in a memory over a link to a memory controller.

2. The memory access unit of claim 1, further comprising:
   logic for generating the lists of addresses from the requests for blocks of pixels, wherein the lists of addresses correspond to addresses in a memory that store pixels in the blocks of pixels.

3. The memory access unit of claim 1, wherein the memory access unit receives data stored at the addresses in the memory from the lists of addresses in the memory over a bus shared with one or more clients.

4. The memory access unit of claim 1, wherein the addresses are non-contiguous.

5. The memory access unit of claim 1, wherein the memory access unit receives data stored at the addresses in the memory from the lists of addresses in the memory over said link.

6. A memory controller for accessing a memory, said memory controller comprising:
   a port for receiving access requests for lists of addresses in a memory over a link from a client;
   another port for receiving requests for accessing the memory over a shared bus from one or more other clients; and
   a queue for queuing the access requests for lists of addresses, wherein the queue orders the addresses in a different order than the addresses are requested.

7. The memory controller of claim 6, further comprising:
   an arbiter for arbitrating between the requests for lists of addresses from the client and the requests for accessing the memory from the one or more other clients.

8. The memory controller of claim 6, wherein the memory controller transmits data stored at the addresses in the memory from the lists of addresses in the memory over the another port.

9. The memory controller of claim 6, wherein the memory controller transmits data stored at the addresses in the memory from the lists of addresses in the memory over the said port.

10. A system for processing video data, said system comprising:
    a memory access unit for receiving requests for blocks of pixels and generating requests to access lists of addresses in a memory;
    a memory controller for receiving the requests to access the lists of addresses in the memory;
    a link connecting the memory access unit and the memory controller for providing the requests to access the lists of addresses in the memory;
    one or more clients for performing one or more functions; and
    a bus for providing access requests from the one or more clients, wherein the bus provides access requests from the addresses in a different order than the requests for addresses in the list were generated.

11. The system of claim 10, wherein the bus provides data stored at the addresses in the memory from the lists of addresses in the memory to the memory access unit.

12. The system of claim 10, wherein the link provides the data stored at the addresses in the memory from the lists of addresses in the memory to the memory access unit.

13. The system of claim 10, further comprising:
    a motion prediction processor for producing predicted pixels from the blocks of pixels.

14. The system of claim 10, wherein the memory access unit further comprises:
    logic for generating the lists of addresses from the requests for blocks of pixels, wherein the lists of addresses correspond to addresses in a memory that store pixels in the blocks of pixels.

15. The system of claim 14, wherein the logic orders the lists so that addresses referring to a same row of a memory bank are ordered in an order to be a common transaction.

16. The system of claim 10, wherein the memory access unit further comprises:
    a queue for queuing the requests for the lists of addresses.

17. The system of claim 10, wherein the memory controller further comprises:
    an arbiter for arbitrating the requests to access the lists of addresses in the memory that are received over the bus, and the requests to access the lists of addresses in the memory over the link.

18. The system of claim 10, further comprising:
    a link coupling the memory access unit and the memory controller for providing the requests to access the lists of addresses in the memory.

19. The system of claim 10, further comprising:
    one or more clients for performing one or more functions; and
    a bus for providing requests for the blocks of pixels from the one or more clients.

* * * * *